123,744

UNITED STATES PATENT OFFICE.

BENJAMIN TANNER, OF NEW BRIGHTON, ENGLAND.

IMPROVEMENT IN THE MANUFACTURE OF SUPERPHOSPHATE OF LIME.

Specification forming part of Letters Patent No. 123,744, dated February 13, 1872.

I, BENJAMIN TANNER, of New Brighton, in the county of Chester, England, have invented certain "Improvements in the Manufacture of Superphosphate of Lime, so as to control its soluble condition," of which the following is a specification:

In the first instance it may be observed that the term "superphosphate of lime" is usually applied to those phosphates of lime which have been manufactured in such a manner that the proportion of phosphoric acid, in combination with the lime, has been increased over and above the proportion existing in the unmanufactured phosphate of lime, and from these circumstances the term "superphosphate" has been derived.

The general practice (which is well known to persons conversant with chemical manufactures) is to convert the tricalcic into monocalcic phosphate, (soluble phosphate of lime,) and thereby to change an insoluble material so as to impart to it a very soluble condition. The soluble phosphate thus formed is, by reason of its great solubility, unsuited for certain soils and climates. It has therefore become desirable to produce superphosphates of lime having an intermediate character, so that, while sufficiently soluble to be steadily available for the purposes of vegetation, they shall not be easily washed out of the soil to which they are applied. It is in some cases advantageous to modify the condition of the slowly-soluble superphosphate of lime by an increase of its solubility so as to suit the varying requirements of soil or climate. These results are economically and advantageously obtained by the processes hereinafter described.

For the convenience of description and reference the following paragraphs, in which the processes embraced by my said invention are described, are numbered consecutively:

1. Phosphate of soda or phosphate of potash, or mixtures thereof, are mixed with sulphate of lime—with or without water—and exposed to heat, whereby a process of decomposition takes place which produces slowly soluble superphosphate of lime and sulphate of soda or sulphate of potash, or mixtures thereof. It is preferred in practice to mix these materials in the proportions of two equivalents of sulphate of lime for each equivalent of phosphoric acid in the phosphate of soda or phosphate of potash, or mixtures thereof, employed —that is to say, one hundred and thirty-six hundred-weights of anhydrous sulphate of lime, or its equivalent in any other form or condition, are added for every seventy-one hundred-weights of phosphoric acid in the phosphate of soda, or phosphate of potash, or mixtures thereof used. Take, for example, the action of phosphate of soda with sulphate of lime. In practice one ton of commercial sulphate of lime, containing eighty per cent. of anhydrous sulphate of lime, would be intermixed with about forty-two hundred-weights of ordinary phosphate of soda, containing nearly twenty per cent. of phosphoric acid, the proportions being varied and regulated according to the strength and purity of the material used. These materials, being intermixed, are exposed in shallow evaporating-pans, or some arrangement similar to that employed in the manufacture of salt-cake, or of soda-ash, or any suitable arrangement in which the temperature of the mixture can be raised (by preference not beyond 280° Fahrenheit by means of heat being applied in the usual manner to the bottom of the vessel) so as to fuse the phosphate or phosphates in the presence of sulphate of lime; and in some cases such heat may be advantageously employed in conjunction with the passage of steam, or superheated steam, or mixtures of steam and hot air into, over, or through the mixture, the temperature so supplied ranging from 212° to 450° Fahrenheit, according to which of the sources of heat has been employed, as hereinafter more fully explained. At the same time such combination is not necessary, as either of the methods of applying heat can be employed separately—decomposition takes place, yielding a slowly-soluble superphosphate of lime and sulphate of soda. It is also desirable in some cases to add water to compensate for loss by evaporation, and to stir the mixture from time to time until the decomposition is completed. The same results can be obtained by adding water to the mixed materials placed in a vessel fitted with rotating arms or any other suitable arrangement, as will be well understood, by which the whole is kept in motion, or by dissolving the phosphate in water and then stirring in the sulphate of lime, as above described, the temperature in either case being raised by either of the methods of applying heat above named, or by any other suitable means. In either case the superphosphate of lime formed is freed from sulphate of soda by means of water, either by filtration, decantation, or otherwise; and, when desirable, it is dried on brick floors, heated by means of flues or by some other convenient drying arrangement, which, however, forms no part of my said invention; and the sulphate of soda in the solution is obtained by evaporation—either as crystals or in any other form that may be desired.

2. Any of the forms of phosphate of soda or phosphate of potash, or mixtures thereof, is or are treated with lime or sulphate of lime, or any of the forms of carbonate of lime, or of phosphate of lime, or chloride of calcium, or mixtures thereof, either with or without being in solution, and either with or without the assistance of heat, but preferably with such assistance, in the form of steam, superheated steam, hot air, or otherwise. The proportions in which these are, by preference, mixed, are regulated so that, after such admixture, for each equivalent of phosphoric acid present there shall be not less than two equivalents of lime or calcium also present—that is to say, for every seventy-one hundred-weights of phosphoric acid present or added there shall be not less than fifty-six hundred-weights of lime or forty hundred-weights of calcium also present. The general line of procedure may be illustrated by describing the treatment of phosphate of soda with lime. To about three hundred and fifty-five hundred-weights of ordinary phosphates of soda containing nearly twenty per cent. of phosphoric acid dissolved in water in some convenient vessel, (the latter being fitted with a rotating agitator and a steam-pipe for the purpose of raising the temperature by means of steam or hot air or by any other means,) about fifty-six hundred-weights of caustic lime (which would be contained in one hundred and twelve hundred-weights of commercial lime containing fifty per cent. lime) is added, having by preference been previously obtained in the condition of milk of lime by intermixture with water in a convenient vessel, and raised to about 120° Fahrenheit by the aid of steam or hot air, and the mixture kept in a state of agitation until the decomposition is completed, or water may be added to the above-mentioned mixture, and the whole treated in a similar manner; or the above-named mixture may be placed in any convenient vessel, and the whole evaporated to a pasty condition, and fused together by either of the methods detailed in paragraph hereof numbered 1, till the decomposition is completed, regulating the temperature so that it does not rise, by preference, much above 212° Fahrenheit, although the product is not injured by a dry heat of a temperature below 280° Fahrenheit, or by superheated steam of a temperature of from 400° to 450° Fahrenheit. On the same principle any of the above-named lime or calcium compounds or mixtures thereof may be employed, regulating the quantity according to their equivalent or combining proportion, (which will be well understood by persons conversant with chemical operations,) and the purity and strength of the materials employed, subsequently treating the mixture as before described. When any phosphate of soda or phosphate of potash, or mixtures thereof, (having less than two equivalents of soda or potash or mixtures thereof combined with one equivalent of phosphoric acid,) is or are employed, mixtures of the before-named lime or calcium compounds may be advantageously used, so that, after such admixture, for every equivalent of phosphoric acid present there shall be not less than two equivalents of lime or calcium also present. Take, for example, the action of monosodic phosphate (acid phosphate of soda) and a mixture of sulphate of lime and lime (say one equivalent or combining proportion of each.) That quantity of monosodic phosphate containing seventy-one hundred-weights of phosphoric acid is taken, and to it is added a mixture of sixty-eight hundred-weights of sulphate of lime and twenty-eight hundred-weights of caustic lime, which would be respectively contained in eighty-five hundred-weights of commercial sulphate of lime containing eighty per cent. anhydrous sulphate of lime and fifty-six hundred-weights of commercial lime containing fifty per cent. caustic lime, and the mixture then treated by any of the processes herein described. On the same principle any mixture of the above-named lime or calcium compounds may be employed, varying the proportion according to the strength and purity of the materials employed. In either case the product will be slowly-soluble superphosphate of lime, which is purified by water from any caustic alkali or alkaline salt, or mixtures thereof present, and dried as hereinbefore described in the paragraph hereof numbered 1, the latter being obtained by evaporation in the desired condition.

3. Phosphoric acid or phosphoric acid and water are mixed with sulphate of lime and chloride of sodium or chloride of potassium, or mixtures thereof, and exposed to heat, whereby a process of decomposition takes place which results in the formation of slowly-soluble superphosphate of lime and sulphate of soda or sulphate of potash, or mixtures thereof. It is preferred to mix these materials in the proportion of one equivalent of phosphoric acid with not less than two equivalents of sulphate of lime and two equivalents of chloride of sodium, or two equivalents of chloride of potassium, or proportional mixtures thereof. That is to say, for every seventy-one hundred-weights of phosphoric acid are added not less than one hundred and thirty-six hundred-weights of anhydrous sulphate of lime (or its equivalent in any other form or condition) and one hundred and seventeen hundred-weights of chloride of sodium or one hundred and forty-nine hundred-weights of chloride of potassium, or proportional mixtures thereof. With a view to the practical attainment of this object, about three hundred and fifty-five hundred-weights of commercial phosphoric acid (containing twenty per cent. of phosphoric acid) mixed with one hundred and seventy hundred-weights of commercial sulphate of lime (containing eighty per cent. of anhydrous sulphate of lime) and one hundred and thirty hundred-weights of chloride of sodium (containing ninety per cent. of pure chloride of sodium) or one hundred and sixty-five and a half hundred-weights of chloride of potassium (containing ninety per cent. of pure chloride of potassium,) or proportional mixtures of chloride of sodium and chloride of potassium, (varying the proportions according to the strength and purity of the materials used,) may be placed in an evaporating-pan, moistened by the addition of water to the condition of a thin paste or limpid mass, and then heated carefully by fire or by hot air at a temperature, by preference, not exceeding 230° Fahrenheit, either with or without the conjoined action of superheated steam not exceeding 400° or 450° Fahrenheit, (but preferably with such assistance,) until the decomposition is completed, the mass being stirred and water added from time to time, as may be required. Any of the processes detailed in paragraph hereof numbered 1 may be employed, continuing the application of heat in either of the modes described, as therein set forth. By these means the mixture is more or less freed from chlorine, which may be condensed or utilized in the ordinary manner. The residue is converted into slowly-soluble superphosphate of lime and sulphate of soda or sulphate of potash, or mixtures thereof. The superphosphate of lime thus formed is purified, by means of water, from soluble matter present, and both heated as hereinbefore described in paragraph numbered 1. When commercial phosphoric acid contains sulphuric acid as an impurity, the quantity thereof should be estimated and an equivalent quantity of chloride of sodium or chloride of potassium, or mixtures thereof, used in addition to the quantities above named—that is to say, for every forty hundred-weights of anhydrous sulphuric acid so present fifty-eight and a half hundred-weights of pure chloride of sodium, or seventy-four and a half hundred-weights of pure chloride of potassium, or proportional mixtures thereof, should be added in addition to that above named, and the process carried on as already described. It is obvious that slowly-soluble superphosphate of lime may also be made by a combination of the processes described in paragraphs hereof numbered 2 and 3, respectively—that is to say, by regulating the proportion of chloride of sodium or chloride of potassium, or mixtures thereof, so as to form monosodic or monopotassic phosphate or trisodic or tripotassic phosphate, or any mixture of any of the phosphates of soda or of potash, and treating them in conjunction with any of the lime or calcium compounds, or mixtures thereof, mentioned in paragraph hereof numbered 2, in the manner above mentioned, as the same principle and processes apply equally in such cases. If too much heat is employed in any of the before-mentioned processes, pyrophosphate of lime is formed, which, (with or without the separation of the salts mixed with it,) is treated with hydrochloric acid and water or with nitric acid and water, or mixtures thereof, and obtained in the form of slowly-soluble superphosphate of lime by careful evaporation of the solution and subsequent decomposition of the solid matter, preferably at a temperature neither exceeding 280° Fahrenheit, when dry heat is used, nor exceeding 450° Fahrenheit when superheated steam is employed. When any mixture of steam and hot air is employed in any of the processes herein named, the temperature is regulated according to the proportion in which they are mixed—that is to say, the temperature of the mixture is decreased as the proportion of hot air to steam is increased.

4. Solutions of the crystals formed by the action of strong hydrochloric acid or phosphoric acid, or mixtures thereof, upon phosphate of lime, as described in the specification of an invention for "improvements in the manufacture of superphosphate of lime," for which Letters Patent have been granted to me in England, bearing date the twenty-eighth day of April, one thousand eight hundred and seventy-one, No. 1,147, are treated with lime or any of the forms of carbonate of lime, or mixtures thereof, by which means the phosphoric acid present is precipitated in the form of a slowly-soluble superphosphate of lime. In carrying out this process it is found convenient to reduce the materials to be added to the solution into a fine powder, either by the aid of water or by a crushing arrangement, and to intermix it with sufficient water, so that it shall be in a soft and limpid condition before being added to the said solution of phosphate of lime. It is also desirable in some cases to warm the mixture of the said lime compounds after the addition of water by the aid of steam or hot air prior to its intermixture with the said solution of phosphate. This mixture of the said lime compounds with water is conveniently effected by agitation in a wooden vat fitted with a central shaft and stirring-arms. From the vat so employed the mixture may be run into a second vat fitted with similar agitating arrangements containing the solution of phosphate. Such addition may be made gradually under the control of a tap or other means for regulating the supply, and should be continued until upon an examination of the solution by ordinary chemical tests being made it is shown to be free or nearly so from phosphoric acid. The agitation of the liquid should be maintained so as to prevent any subsidence of solid matter, and the temperature may be advantageously kept up to about 120° Fahrenheit until the precipitation is completed. The mixture may then be run into a draining-tank fitted with a false bottom covered with a draining-cloth, which, while allowing the clear liquor to run through, will hold back the precipitated phosphate. By passing water through the bed of slowly-soluble superphosphate thus formed, it is easily freed from chloride of calcium; and when so washed it can be dried upon brick floors heated by flues, or by some other drying arrangement, as well understood.

5. Crystals formed by the action of strong hydrochloric acid on phosphate of lime, either with or without solution in water, are treated with phosphoric acid, or sulphuric acid, or oxalic acid, or mixtures thereof, by preference in such proportion that after such admixture there shall be for every seventy-one hundred-weights of phosphoric acid present fifty-six hundred-weights of lime or forty hundred-weights of calcium remaining available for or in combination with the phosphoric acid. When the crystals are dissolved in water the amount of phosphoric acid and lime or calcium present in such solution is determined by chemical analysis. Thus, supposing, for example, thirty-six tons of such solution contained seventy-one hundred-weights of phosphoric acid and eighty-four hundred-weights of lime or sixty hundred-weights of calcium, it would require either 177.5 hundred-weights of commercial phosphoric acid containing twenty per cent. of phosphoric acid, or 66.7 hundred-weights of commercial sulphuric acid containing sixty per cent. of anhydrous sulphuric acid, 61.5 hundred-weights of crystallized oxalic acid, or any proportional mixture thereof, to bring the phosphoric acid and lime or calcium into the desired proportions. The acid being more or less diluted with water, the admixture may be conveniently accomplished in a wooden vessel fitted with a rotating agitator, by which the whole is kept in motion until thoroughly intermixed and the chemical action is completed; and to facilitate the latter result I sometimes raise the temperature from 180° to 212° Fahrenheit. When sulphuric acid, or oxalic acid, or mixtures thereof, is or are thus employed, the mixture is transferred to a filtering arrangement and the insoluble matter separated, which latter is then washed; (but when phosphoric acid is used without any sulphuric acid or oxalic acid such filtration is unnecessary.) The clear liquor and washings can then be run off to a convenient evaporating-vessel, where the decomposition and drying are completed, by preference, with the assistance of superheated steam having a temperature not exceeding 400° or 450° Fahrenheit, and which results in the formation of slowly-soluble superphosphate of lime. When the crystals are treated without solution in water their chemical composition is determined, and the above-named acids or mixtures thereof is or are added, so that after such addition there shall be for every seventy-one hundred-weights of phosphoric acid present fifty-six hundred-weights of lime, or forty hundred-weights of calcium, remaining available for or in combination with the phosphoric acid. Suppose, for example, two hundred and fifty hundred-weights of crystals contained seventy-one hundred-weights of phosphoric acid and eighty-four hundred-weights of lime, or sixty hundred-weights of calcium, it would require either 177.5 hundred-weights of commercial phosphoric acid containing twenty per cent of phosphoric acid, or 66.7 hundred-weights of commercial sulphuric acid containing sixty per cent. of anhydrous sulphuric acid, or 61.5 hundred-weights of crystallized oxalic acid, or any proportional mixture thereof, to bring the phosphoric acid and lime or calcium into the desired proportions. The acid or acids employed—the oxalic acid being dissolved in water—is or are thoroughly intermixed with the crystals by any suitable arrangement, and the mixture sometimes subjected to a gentle increase of temperature to facilitate the chemical action. The soluble portion is removed by washing with water, either by filtration, decantation, or otherwise, and then conveyed to a convenient evaporating-vessel where the decomposition and drying are completed, as already described, which results in the formation of slowly-soluble superphosphate of lime. The hydrochloric acid given off by any of the foregoing processes is either condensed or utilized by any of the arrangements usually adopted for such purposes, and which are well known to persons conversant with manufacturing chemistry.

6. When the slowly-soluble superphosphate of lime is required in any more rapid condition of solubility, this object can be attained by proportionally decreasing the percentage of the lime it contains, this object being effected by mixing it with as much phosphoric acid, or sulphuric acid, or oxalic acid, or mixtures thereof, as shall be required for the reduction to be made in the proportion of lime; and, if necessary, by warming the mixture on a hot floor or other convenient arrangement, in order to perfect the action and to obtain the product in the required condition. When the superphosphate of lime is required in a very high condition of solubility, or in great purity, the soluble phosphate is dissolved out by the use of water and evaporated.

It should be observed that the proportions of the substances employed for the purposes of my said invention are not in all cases precisely such as are hereinbefore mentioned, as such proportions may—as will be well understood by persons conversant with the manufacture of analogous chemical products—in some instances be varied without departing from the principle of my said invention.

Having thus declared and ascertained the nature of my invention and in what manner the same is to be performed, I would observe, in conclusion, that what I consider novel and original, and therefore claim as the invention intended to be secured to me, are—

1. The production of slowly-soluble superphosphate of lime, in the manner substantially hereinbefore described and set forth.

2. The production of superphosphates of lime having varying degrees of solubility, in the manner substantially hereinbefore described and set forth.

3. The production of soda or potash in a caustic condition, or in combination with an acid, or any mixtures thereof, as by products arising in the manufacture of slowly-soluble superphosphate of lime, in the manner substantially hereinbefore described and set forth.

BENJAMIN TANNER.

Witnesses:
 WILLIAM J. ROBINSON,
  *Not. Pub., Liverpool.*
 WM. ROGER BELL,
  *His clerk.*